US010107715B2

(12) United States Patent
Soneda et al.

(10) Patent No.: US 10,107,715 B2
(45) Date of Patent: Oct. 23, 2018

(54) ESTIMATION APPARATUS, ESTIMATION METHOD AND ENGINE SYSTEM

(71) Applicant: FUJITSU LIMITED, Kawasaki-shi, Kanagawa (JP)

(72) Inventors: Hiromitsu Soneda, Atsugi (JP); Masatoshi Ogawa, Zama (JP); Takeo Kasajima, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/351,716

(22) Filed: Nov. 15, 2016

(65) Prior Publication Data

US 2017/0167950 A1    Jun. 15, 2017

(30) Foreign Application Priority Data

Dec. 10, 2015  (JP) .................................. 2015-241297

(51) Int. Cl.
*G01M 15/06* (2006.01)
*F02D 41/24* (2006.01)
(Continued)

(52) U.S. Cl.
CPC ......... *G01M 15/06* (2013.01); *F02D 41/0097* (2013.01); *F02D 41/1497* (2013.01); *F02D 41/2416* (2013.01); *G01P 3/481* (2013.01); *G01P 3/489* (2013.01); *F02D 41/009* (2013.01); *F02D 2041/0092* (2013.01); *F02D 2041/0095* (2013.01); *F02D 2041/1433* (2013.01); *F02D 2200/1004* (2013.01)

(58) Field of Classification Search
CPC ............. F02D 41/0097; F02D 41/2416; F02D 2200/101; F02D 2200/1012; F02D 2200/1004
USPC ..................................................... 123/406.58
See application file for complete search history.

(56) References Cited

U.S. PATENT DOCUMENTS 5,717,133 A * 2/1998 Wu ........................ G01M 15/11
123/436
7,047,122 B2 * 5/2006 Damitz ................. F02D 41/009
701/101
(Continued)

FOREIGN PATENT DOCUMENTS

JP          03-167478        7/1991
JP          2009-518585      5/2009

*Primary Examiner* — Sizo Vilakazi
*Assistant Examiner* — Kevin R Steckbauer
(74) *Attorney, Agent, or Firm* — Fujitsu Patent Center

(57) ABSTRACT

An estimation apparatus, includes: a sensor, disposed in the proximity of a crank rotor, configured to output a signal in response to a positional variation of an outer periphery of the crank rotor, the crank rotor including a plurality of protruding teeth formed at given distances and a tooth-missing region on an outer periphery of the crank rotor and configured to rotate in an interlocking relationship with a crankshaft of an internal combustion engine; and a processor configured to calculate a crank angular velocity of the internal combustion engine at given time intervals from the signal output from the sensor and estimate a first crank angular velocity corresponding to the tooth-missing region from second crank angular velocities at two or more points corresponding to at least one of portions before and after the tooth-missing region.

12 Claims, 17 Drawing Sheets

(51) Int. Cl.
    *F02D 41/14*     (2006.01)
    *G01P 3/481*     (2006.01)
    *G01P 3/489*     (2006.01)
    *F02D 41/00*     (2006.01)

(56) References Cited

U.S. PATENT DOCUMENTS

| | | | | |
|---|---|---|---|---|
| 7,363,141 | B2* | 4/2008 | Fujii | F02M 47/027 123/480 |
| 7,436,186 | B2* | 10/2008 | Boettcher | F02D 41/009 123/406.61 |
| 7,772,837 | B2* | 8/2010 | Kassner | G01D 5/2457 324/207.25 |
| 7,886,584 | B2* | 2/2011 | Machida | F02D 41/009 73/114.27 |
| 2005/0212508 | A1* | 9/2005 | Damitz | F02D 41/009 324/207.2 |
| 2007/0056564 | A1* | 3/2007 | Fujii | F02M 47/027 123/480 |
| 2007/0085547 | A1* | 4/2007 | Boettcher | F02D 41/009 324/381 |
| 2008/0158039 | A1* | 7/2008 | Kassner | G01D 5/2457 341/182 |
| 2008/0312865 | A1 | 12/2008 | Zouboff | |
| 2009/0158832 | A1* | 6/2009 | Machida | F02D 41/009 73/114.27 |
| 2012/0304962 | A1* | 12/2012 | Tumelaire | F02D 41/1497 123/349 |
| 2013/0289933 | A1* | 10/2013 | Hess | G01P 3/489 702/145 |
| 2015/0260748 | A1* | 9/2015 | Marconato | F02D 41/009 702/145 |

* cited by examiner

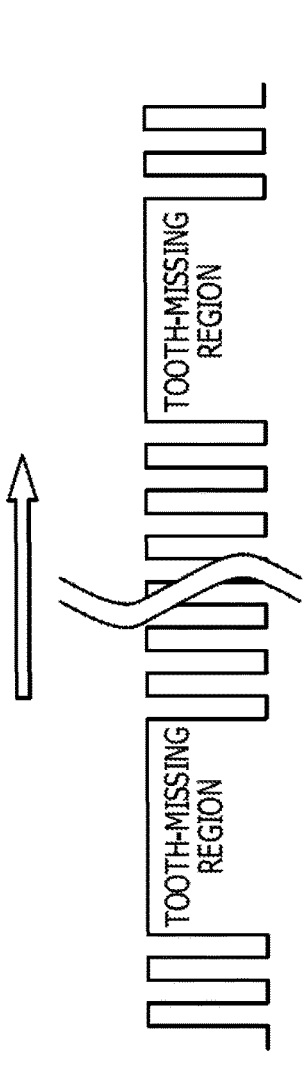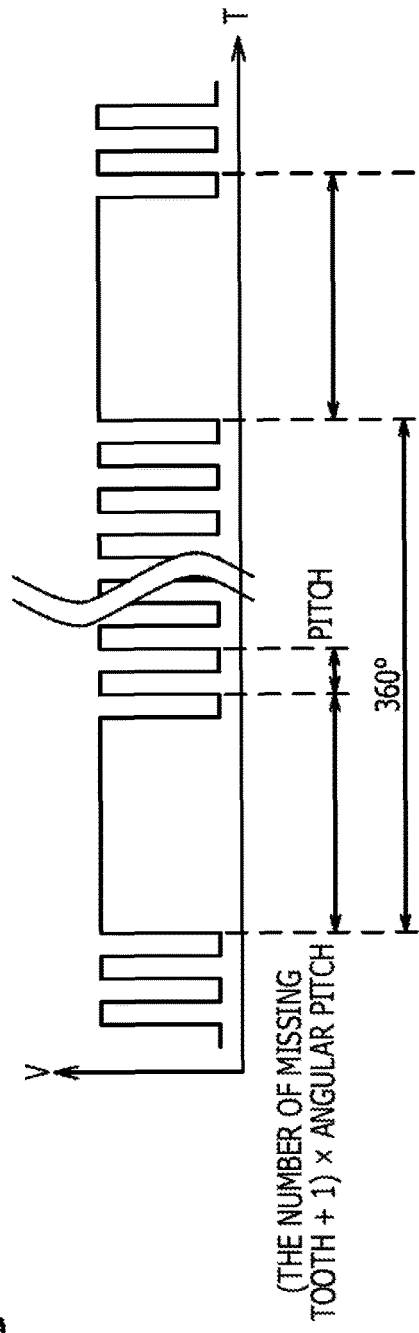
FIG. 3A
FIG. 3B

CRANK ANGLE [deg]

| Y | $a_0$ | $a_n$ | | | | | | | |
|---|---|---|---|---|---|---|---|---|---|
| | | 36 | 42 | 48 | 54 | 96 | 102 | 108 | 114 |
| 60 | | | | | | | | | |
| 66 | | | | | | | | | |
| 72 | | | | | | | | | |
| 78 | | | | | | | | | |
| 84 | | | | | | | | | |
| 90 | | | | | | | | | |

ESTIMATION APPARATUS, ESTIMATION METHOD AND ENGINE SYSTEM

CROSS-REFERENCE TO RELATED APPLICATION

This application is based upon and claims the benefit of priority of the prior Japanese Patent Application No. 2015-241297, filed on Dec. 10, 2015, the entire contents of which are incorporated herein by reference.

FIELD

The present embodiment relates to an estimation apparatus, an estimation method and an engine system.

BACKGROUND

Detection of a crank angular velocity is performed.
A related art is disclosed in Japanese Laid-open Patent Publication No. 03-167478 and Japanese National Publication of International Patent Application No. 2009-518585.

SUMMARY

According to an aspect of the embodiment, an estimation apparatus, includes: a sensor, disposed in the proximity of a crank rotor, configured to output a signal in response to a positional variation of an outer periphery of the crank rotor, the crank rotor including a plurality of protruding teeth formed at given distances and a tooth-missing region on an outer periphery of the crank rotor and configured to rotate in an interlocking relationship with a crankshaft of an internal combustion engine; and a processor configured to calculate a crank angular velocity of the internal combustion engine at given time intervals from the signal output from the sensor and estimate a first crank angular velocity corresponding to the tooth-missing region from second crank angular velocities at two or more points corresponding to at least one of portions before and after the tooth-missing region.

The object and advantages of the invention will be realized and attained by means of the elements and combinations particularly pointed out in the claims.

It is to be understood that both the foregoing general description and the following detailed description are exemplary and explanatory and are not restrictive of the inventor, as claimed.

BRIEF DESCRIPTION OF DRAWINGS

FIGS. 3A and 3B illustrate an example of a relationship between a position of a gear wheel of a crank rotor and an output signal of a crank angle sensor.

DESCRIPTION OF EMBODIMENT

A crank angular velocity is detected, for example, by detecting passage of protrusions of a crank rotor. However, since the crank rotor includes a tooth-missing region provided intentionally thereon, it may be difficult to accurately measure the crank angular velocity in the tooth-missing region. For example, a technology for suppressing an influence of the tooth-missing region is used.

For example, it may be difficult to accurately estimate the crank angular velocity in the tooth-missing region.

In order to satisfy a demand for improvement in fuel cost or exhaust gas of an engine (internal combustion engine), detailed engine control may be performed. For detailed engine control, torque-based control wherein torque generation of the engine is controlled in response to requested torque based on an axle operation or the like of a driver is performed. In the control based on the engine torque, it may be demanded to accurately estimate torque.

The engine torque is a physical quantity in engine control for implementing improvement in fuel cost and reduction in emission. For example, it may be difficult to directly measure the engine torque using an arbitrary sensor of an actual vehicle. According to a method in which the engine torque is calculated from a volume variation and a pressure variation in a cylinder by installation of a pressure sensor, the engine torque is estimated with a high degree of accuracy. However, the pressure sensor is introduced newly. This gives rise to problems in terms of cost, durability, maintenance and so forth. Therefore, when the torque is estimated using a crank angular velocity detected by a crank angle sensor installed in an automobile at present without newly introducing a sensor, the crank angle sensor of the automobile may be effectively used in performance improvement in torque-based control.

For example, since a tooth-missing region in which a tooth is caused to miss intentionally is provided on the crank rotor, it may be difficult to accurately measure the crank angular velocity in the tooth-missing region.

Figure 1:
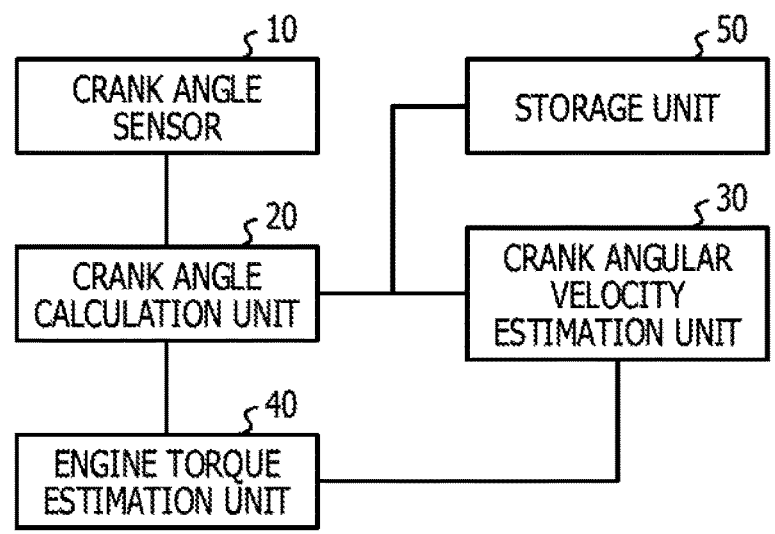
FIG. 1 depicts an example of a functional block of an estimation apparatus.

FIG. 1 depicts an example of a functional block of an estimation apparatus. Referring to FIG. 1, an estimation apparatus 100 includes a crank angle sensor 10, a crank angle calculation unit 20, a crank angular velocity estimation unit 30, an engine torque estimation unit 40 and a storage unit 50. The crank angle sensor 10 outputs a signal relating to a crank angle. The crank angle calculation unit 20 calculates a variation of the crank angle with respect to time based on the signal output from the crank angle sensor 10. The crank angular velocity estimation unit 30 estimates a crank angular velocity based on the variation of the crank angle calculated by the crank angle calculation unit 20. The engine torque estimation unit 40 estimates engine torque based on the variation of the crank angle calculated by the crank angle calculation unit 20 and the crank angular velocity estimated by the crank angular velocity estimation unit 30.

Figure 2A:
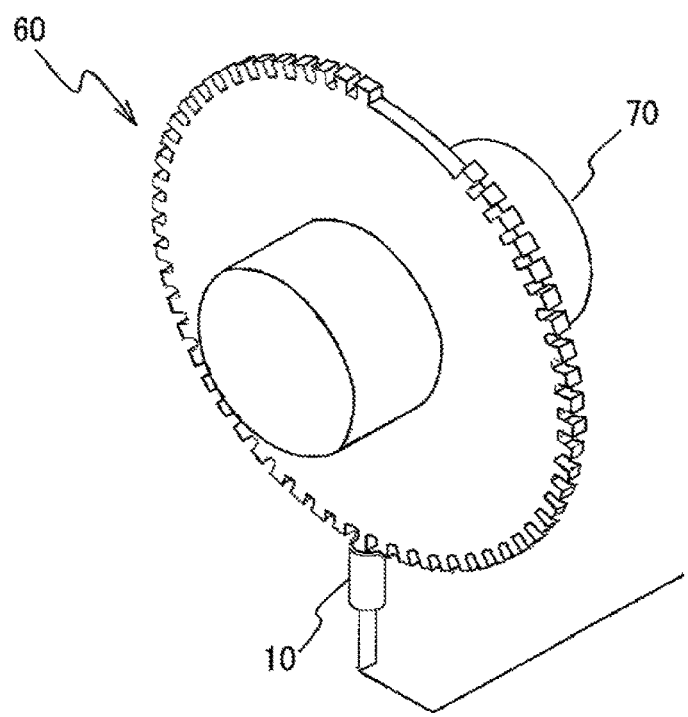
FIG. 2A depicts an example of a perspective view of a crank angle sensor.

FIG. 2A depicts an example of a perspective view of the crank angle sensor. As depicted in FIG. 2A, the crank angle sensor 10 may be, for example, an electromagnetic pickup sensor. The crank angle sensor 10 is disposed in the proximity of a crank rotor 60 that rotates in an interlocking relationship with a crankshaft 70 of the engine and is disposed, for example, such that it opposes to a protrusion of an outer periphery of the crank rotor 60. Accordingly, when the crank rotor 60 rotates, the shape of the outer periphery of the crank rotor 60 that passes by the crank angle sensor 10 varies. The crank angle sensor 10 converts a magnetic variation caused by the shape variation of the outer periphery of the crank rotor 60 into a pulse signal and outputs the pulse signal as a signal relating to a crank angle. For example, the crank angle sensor 10 outputs a signal relating to the crank angle in accordance with the variation of the position of the outer periphery of the crank rotor 60 upon rotation.

Figure 2B:
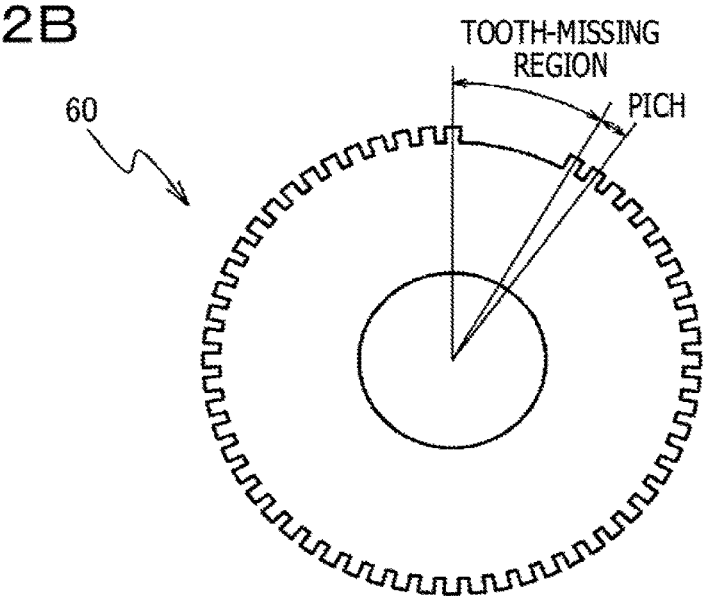
FIG. 2B depicts an example of a crank rotor.

FIG. 2B depicts an example of the crank rotor. The crank rotor 60 includes a gear wheel structure wherein a plurality of protrusion-like teeth formed at given distances on an outer periphery of the crank rotor 60. The distance between the protrusion-like teeth may be hereinafter referred to as pitch. The pitch is a distance, for example, from the center of a protrusion-like tooth to the center of an adjacent protrusion-like tooth and may be represented, in a state in which it is assumed that the crank rotor 60 has no missing tooth, by "360 degrees/number of teeth." The pitch may correspond to a resolution of the crank angle sensor 10.

The crank rotor 60 includes a signal tooth in which one or more teeth are removed intentionally over a given range. The signal tooth in which one or more teeth are removed may be hereinafter referred to as tooth-missing region. The tooth-missing region is a zone in which a protrusion-like tooth of the pitch is not formed, and is formed over a distance greater than one pitch in a circumferential direction on the outer periphery of the crank rotor 60. For example, the tooth-missing region may include a length substantially equal to five pitches. The number of missing teeth may be four.

Except for the tooth-missing region, a protrusion moves toward and away from the crank angle sensor 10 in a period of the pitch, and therefore, a pulse signal in accordance with a variation of the magnetic field is output from the crank angle sensor 10. Since a protrusion-like tooth of the pitch is not formed in the tooth-missing region, a variation appears in the signal output from the crank angle sensor 10. By detecting this variation, it is detected that the tooth-missing region passes a position proximate to the crank angle sensor 10. By using the tooth-missing region as a reference, a reference position such as a top dead center may be detected from the output signal of the crank angle sensor 10. If the reference position is detected, the crank position and the crank angle are detected.

FIGS. 3A and 3B illustrate an example of a relationship between a position of the gear wheel of the crank rotor and the output signal of the crank angle sensor. FIG. 3A exemplifies a relationship between the position of the gear wheel positioned nearest to the crank angle sensor 10 and the elapsed time. FIG. 3B exemplifies the output signal of the crank angle sensor 10 at the elapsed time corresponding to FIG. 3A.

As depicted in FIG. 3A, as the time elapses, the protrusion-like teeth and the tooth-missing region successively move toward and away from the crank angle sensor 10. A pulse signal is outputted corresponding to the movement as depicted in FIG. 3B. For example, if a start point of a protrusion-like tooth 10 comes near the crank angle sensor, the pulse signal drops (Low), and then if an end point of the protrusion-like tooth of the crank angle sensor 10 comes near, the pulse signal rises (High). For example, a pulse signal is detected at a given time interval. The pitch of the pulse signal corresponds to the pitch of the crank rotor 60. In the period of one pitch of the pulse signal, the crank rotor 60 rotates by an angle corresponding to one pitch.

When the tooth-missing region passes the position nearest to the crank angle sensor 10, a magnetic field variation does not occur, and therefore, the pulse signal keeps the high level. A period until a next rising edge of the pulse signal is detected corresponds to a time period in which the crank rotor 60 rotates by (the number of missing teeth+1)×angular pitch. Since no variation appears in the output signal in the tooth-missing region, the angular resolution may drop.

Figure 4:
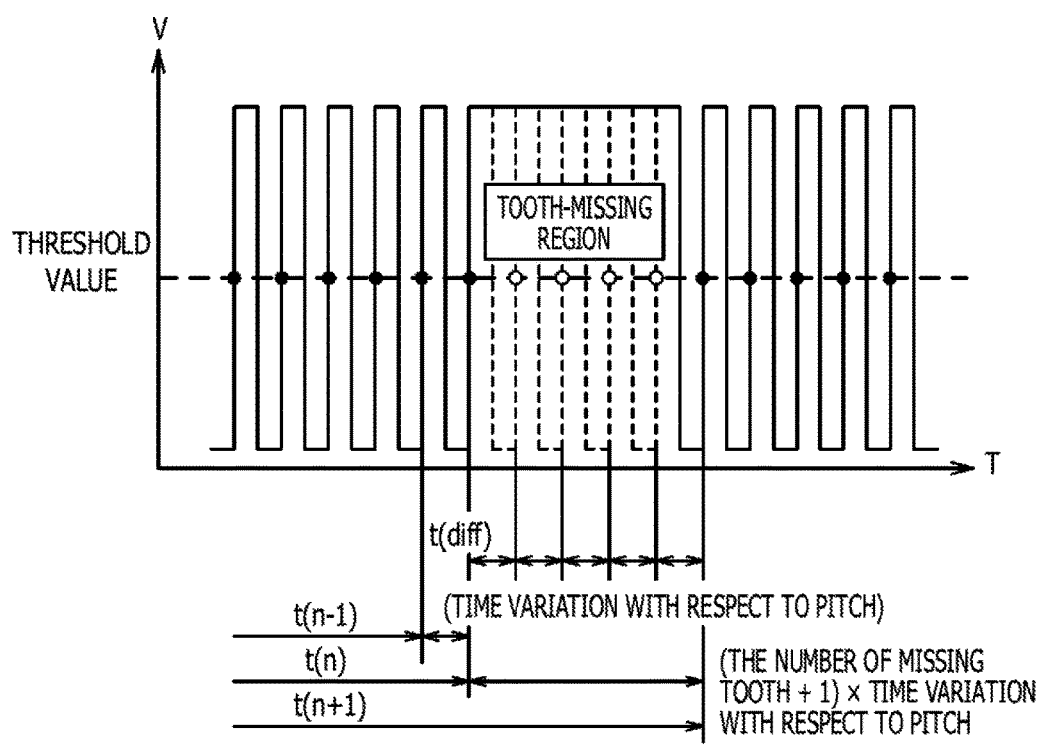
FIG. 4 illustrates an example of a variation in time of an output signal of a crank angle sensor.

FIG. 4 illustrates an example of a variation in time of the output signal of the crank angle sensor. As depicted in FIG. 4, the crank angle calculation unit 20 calculates a time period over which the pulse signal exceeds a threshold value (pulse rise time period) and successively allocates (integrates) an angular pitch to a pulse rise time period to generate crank angle data. As the threshold value in this case, for example, ½ the sensor output may be used. To the tooth-missing region, (the number of missing teeth+1)× angular pitch is allocated. Since no output signal is generated in the tooth-missing region, a detailed variation with respect to time corresponding to the angular pitch may not be detected.

For example, as a method for estimating torque from a crank angle detected by the crank angle sensor 10, a method of calculating the product of a crank angular acceleration and a moment of inertia of an engine system is available. The crank angular acceleration is calculated from a variation of the crank angle with respect to time. However, in the tooth-missing region provided on the crank rotor 60, a detailed variation with respect to time may not be obtained. Therefore, a variation with respect to time corresponding to the crank angle variation in the tooth-missing region may be obtained assuming that the pulse signals corresponding to the number of missing teeth in the tooth-missing region are generated in the tooth-missing region.

Figure 5:
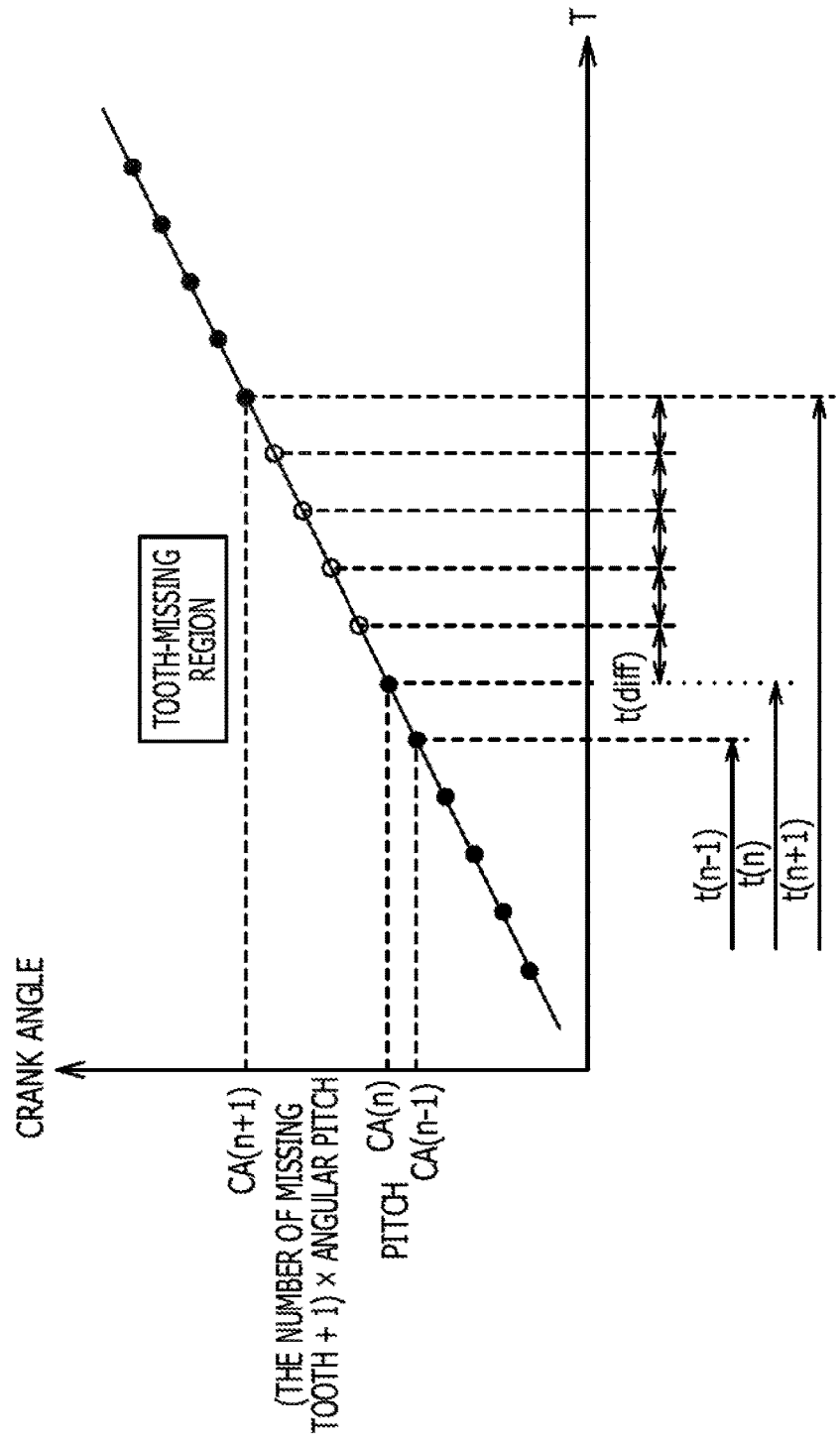
FIG. 5 illustrates an example of uniform division.

FIG. 5 illustrates an example of uniform division. For example, as depicted in FIG. 5, a variation in time with respect to the crank angle variation of the tooth-missing region={(the number of missing teeth+1)×angular pitch} may be divided uniformly by the (the number of missing teeth+1). In FIG. 5, a blank circle indicates a point at which a rising edge of the pulse signal is detected. A blank circle indicates a point obtained by the uniform division.

Figure 6:
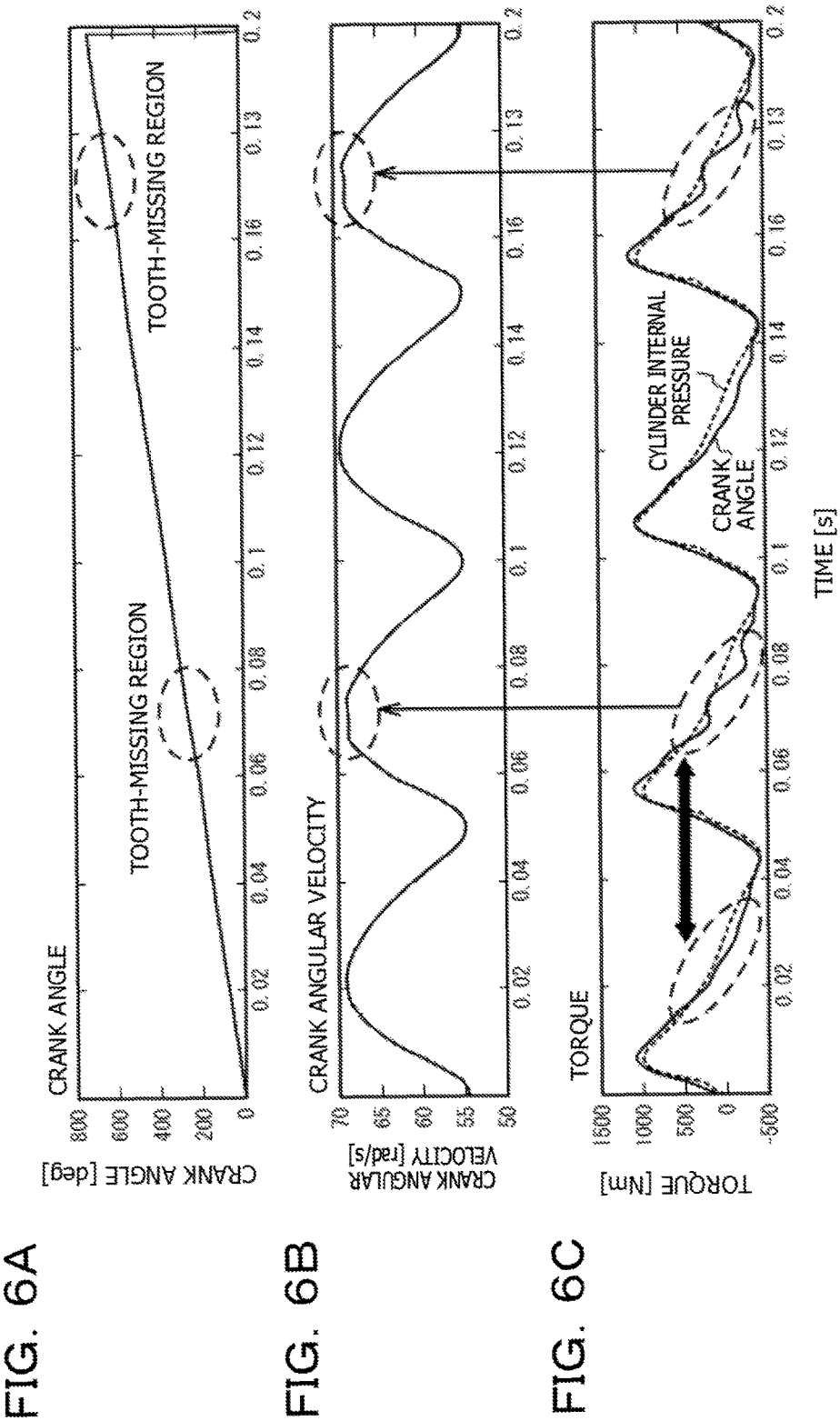
FIGS. 6A to 6C illustrate an example of estimation of torque.

FIGS. 6A to 6C illustrate an example of estimation of torque. FIG. 6C illustrates torque estimated based on uniform division. FIG. 6A illustrates a relationship between the elapsed time and the crank angle. FIG. 6B illustrates a relationship between the elapsed time and the crank angular velocity. For example, the pitch of the crank rotor 60 is six degrees, and the number of missing teeth is four. The tooth-missing region passes the crank angle sensor 10 in the proximity of 250 degrees and 610 degrees of the crank angle. For example, the number of cylinders of the engine is four, and all of the cylinders may experience combustion once in two rotations (720 degrees) of the crankshaft.

The engine torque may be obtained as the product of the crank angular acceleration and the moment of inertia of the engine system. A solid line curve in FIG. 6C indicates a result of the product of the crank angular acceleration and the moment of inertia of the engine system. A broken line curve in FIG. 6C indicates torque calculated from the cylinder volume and the variation of the cylinder internal pressure. As illustrated in FIG. 6C, the product of the crank angular acceleration and the moment of inertia of the engine system is compared with a torque value calculated from the cylinder volume and the variation of the cylinder internal pressure. The waveform indicates some disorder in the tooth-missing region. For example, the torque estimation error exhibits an increase. It is less easy to read an influence of the tooth-missing region from a variation of the crank angle in FIG. 6A. From the crank angular velocity variation depicted in FIG. 6B, an influence of the tooth-missing region may be read readily.

Figure 7:
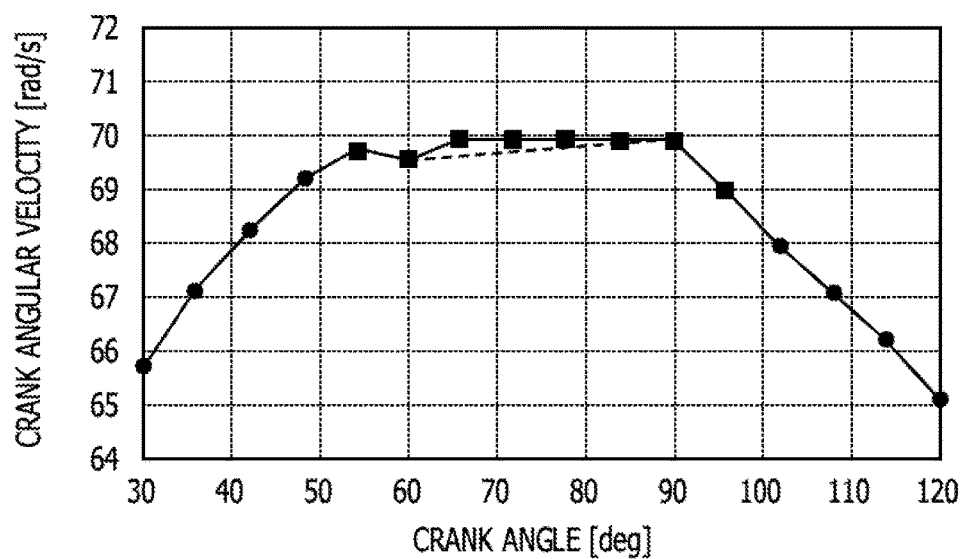
FIG. 7 illustrates an example of a reason why an influence of a tooth-missing region appears in a crank angular velocity variation.

FIG. 7 illustrates an example of a reason why an influence of the tooth-missing region appears in the crank angular velocity variation. The variation of the crank angle is calculated from a signal output from the crank angle sensor 10. The crank angular velocity is calculated from the variation of the crank angle. The crank angular acceleration is calculated from the crank angular velocity variation. In the tooth-missing region, the crank angular velocity indicates a smooth curve having less turbulence. However, if the variation in time with respect to the variation of the angular pitch is divided uniformly in the tooth-missing region, the crank angular velocity may have a fixed value. Therefore, an error occurs with the actual crank angular velocity as depicted in FIG. 7. Although the tooth-missing region appears, in FIG. 6B, in the proximity of 250 degrees, the tooth-missing region appears, in FIG. 7, at a portion subtracted by 180 degrees.

Figures 8A, 8B:
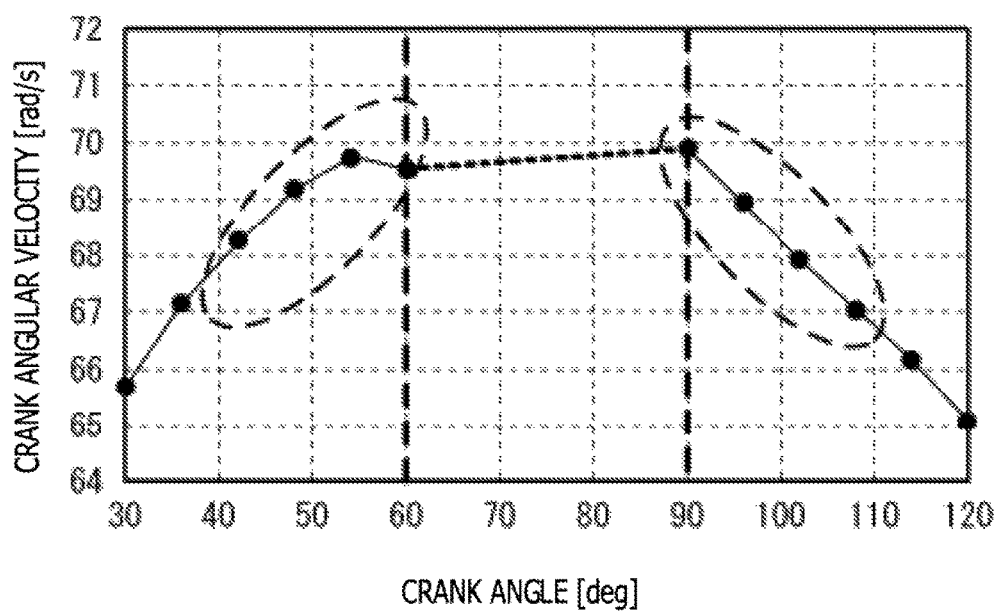
FIG. 8A illustrates an example of interpolation.
FIG. 8B illustrates an example of model parameters.

The crank angular velocity estimation unit 30 estimates the crank angular velocity by interpolating the crank angular velocity in the tooth-missing region on the basis of a mathematical model using two or more points corresponding to at least one of crank angular velocities at portions before (preceding to) and after (succeeding) the tooth-missing region. As the mathematical model, for example, a multiple regression model may be used. FIG. 8A illustrates an example of interpolation. FIG. 8B illustrates an example of model parameters. The crank angular velocity estimation unit 30 interpolates the crank angular velocity in the tooth-missing region on the basis of a mathematical model using, as depicted in FIG. 8A, four points (42, 48, 54 and 60 degrees) preceding to the tooth-missing region and four points (90, 96, 102 and 108 degrees) succeeding the tooth-missing region.

For example, the following expression (1) may be used:

$$Y = a_0 + \Sigma_{n=1}^{p} a_n X_n \quad (1)$$

where "Y" is an objective variable, "$X_n$" is an explanatory variable, "$a_0$" is an intercept, "$a_n$" is a coefficient, and "p" is a number of explanatory variables. The objective variable is, for example, a crank angular velocity at an angular pitch to be obtained. The explanatory variables are, for example, crank angular velocities before and after the tooth-missing region to be referred to in order to calculate the objective variable. The intercept is, for example, a constant which does not rely upon the explanatory variables. The coefficient is, for example, a constant for each explanatory variable. Coefficients as many as explanatory variables may be prepared.

The crank angular velocity estimation unit 30 uses, as the objective variables, crank angular velocities at four points (66, 72, 78 and 84 degrees) within the range of 60 to 90 degrees of the tooth-missing region. The crank angular velocity estimation unit 30 uses, as the explanatory variables, crank angular velocities at the above-described eight points (42, 48, 54, 60, 90, 96, 102 and 108 degrees) before and after the tooth-missing region. The crank angular velocity estimation unit 30 prepares the above-described expression (1) for each objective variable and derives the objective variables using the expressions. The intercept and the coefficient are obtained in advance for each objective variable from information of the zone that includes no missing tooth. FIG. 8B illustrates an intercept and a coefficient for each objective variable. The model parameters of FIG. 8B are stored in the storage unit 50. The model parameters of FIG. 8B may be obtained for each engine speed.

Figure 9A:
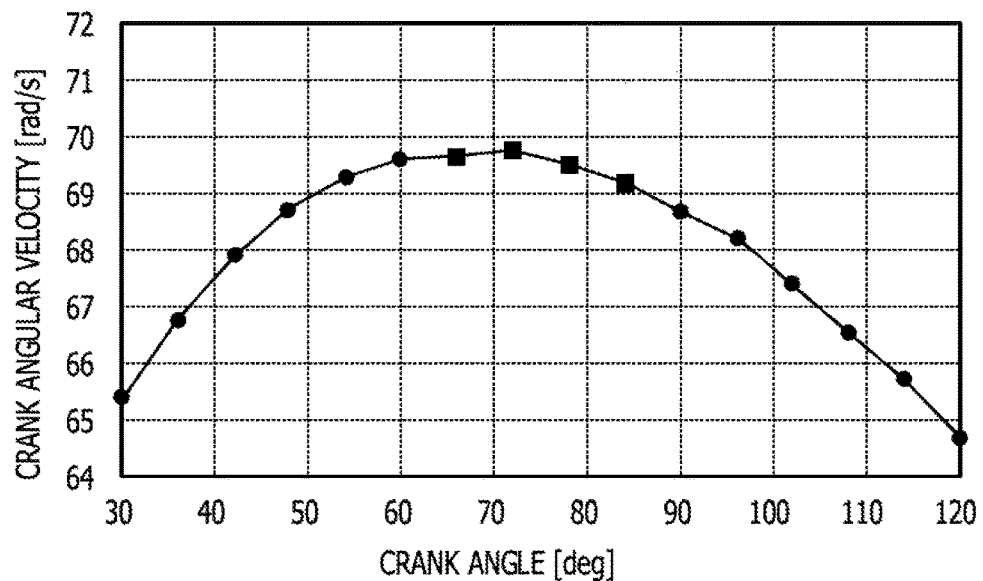
FIG. 9A illustrates an example of actual measurement values of a crank angular velocity within a zone that includes no missing tooth.

FIG. 9A illustrates an example of actual measurement values of the crank angular velocity within the zone that includes no missing tooth. The actual measurement values are each indicated by a round mark. As depicted in FIG. 9A, the actual measurement values of the crank angular velocity indicate a smooth curve having less disorder. In FIG. 9A, estimation values of the crank angular velocity obtained using a multiple regression model are indicated additionally. The estimation values are each represented by a square mark. The estimation values at the four points have been estimated from a plurality of other actually measured values. Since the differences between the actual measurement values and the estimation values are small, the crank angular velocities are estimated with a high degree of accuracy using the multiple regression model.

Figure 9B:
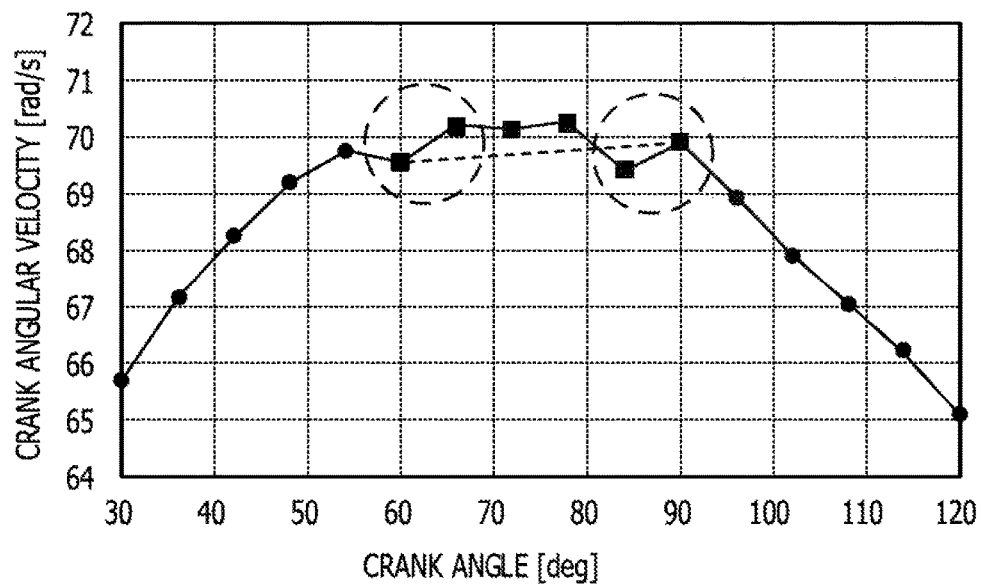
FIG. 9B illustrates an example of estimation values of a crank angular velocity calculated using a multiple regression model for a tooth-missing region.

FIG. 9B illustrates an example of estimation values of the crank angular velocity calculated using the multiple regression model for the tooth-missing region. Although, in order to facilitate the description, the axis of abscissa in FIG. 9B exhibits same values as those of the axis of abscissa of FIG. 9A, actually the axis of abscissa in FIG. 9B may exhibit values obtained by adding 180 degrees to the values of the axis of abscissa of FIG. 9A. In FIG. 9B, a round mark indicates an actual measurement value and a square mark indicates an estimation value. As depicted in FIG. 9B, each of the estimation values is closer to the respective actual measurement values in comparison with FIG. 6B. For example, the crank angular velocity is calculated with a high degree of accuracy.

Figure 10:
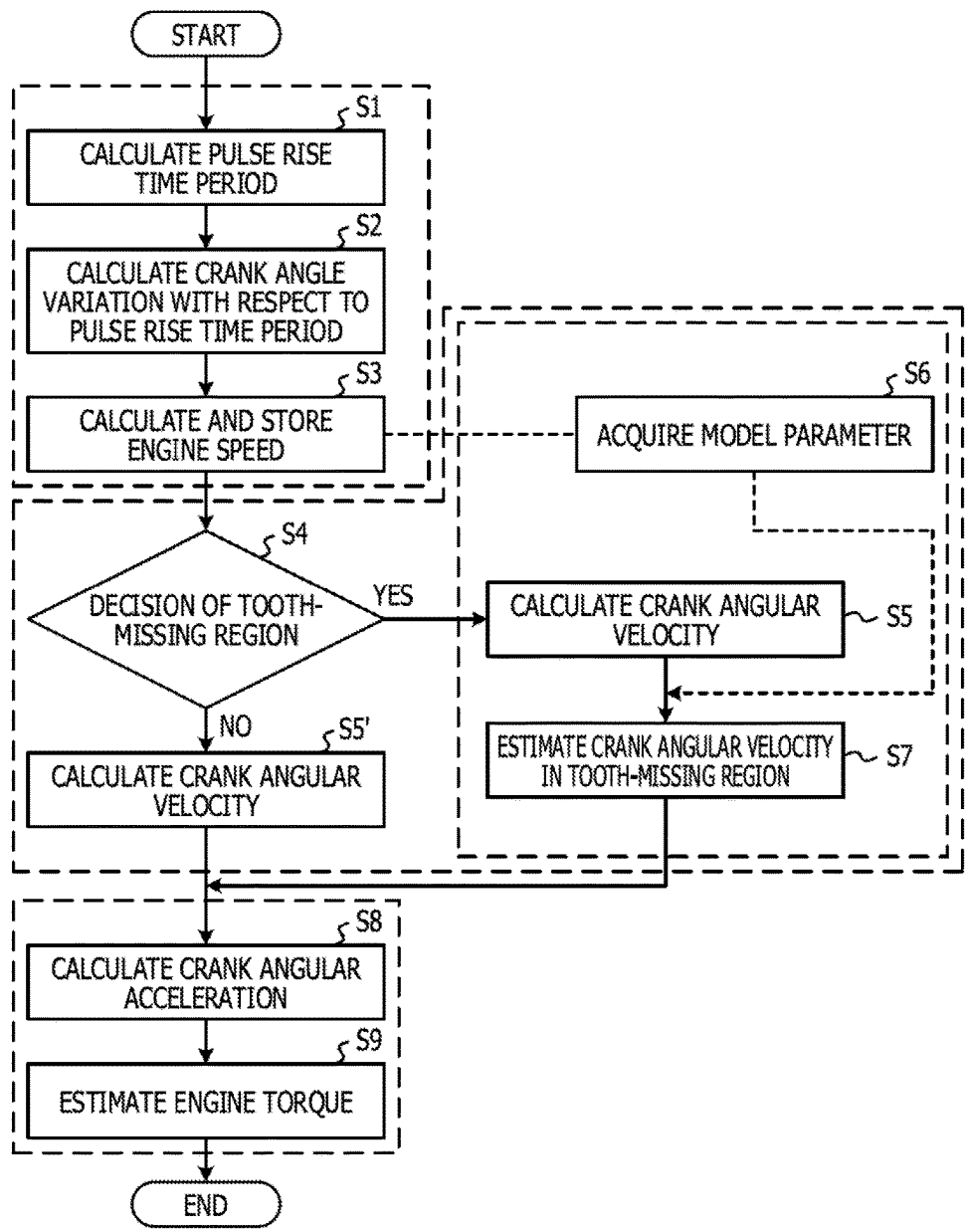
FIG. 10 illustrates an example of an estimation process of engine torque by an estimation apparatus.

FIG. 10 illustrates an example of an estimation process of engine torque by the estimation apparatus. As depicted in FIG. 10, the crank angle calculation unit 20 calculates a pulse rise time of each pulse using a pulse signal output from the crank angle sensor 10 (operation S1). The crank angle calculation unit 20 successively allocates (integrates) an angular pitch to the pulse rise time to calculate a variation of a crank angle with respect to the pulse rise time (operation S2).

The crank angle calculation unit 20 calculates the engine speed using the pulse rise time obtained in the operation S1 and the variation of the crank angle obtained in the operation S2 and stores the calculated engine speed into the storage unit 50 (operation S3). The crank angular velocity estimation unit 30 decides whether or not the tooth-missing region is detected using the pulse rise time obtained in the operation S1 and the variation of the crank angle obtained in the operation S2 (operation S4).

If the decision in the operation S4 is "Yes," the crank angular velocity estimation unit 30 calculates the crank angular velocity per a crank angle before and after the tooth-missing region using the variation of the crank angle obtained in the operation S2 (operation S5). Then, the crank angular velocity estimation unit 30 refers to the engine speed stored in the operation S3 to acquire model parameters corresponding to the engine speed from the storage unit 50 (operation S6). The crank angular velocity estimation unit 30 estimates the crank angular velocity in the tooth-missing region using the expression (1) given hereinabove (operation S7).

When the decision by the operation S4 is "No", the crank angular velocity estimation unit 30 calculates the crank angular velocity per a crank angle for a region other than the tooth-missing region using the variation of the crank angle obtained in the operation S2 (operation S5'). After the operation S5' or the operation S7 is executed, the engine torque estimation unit 40 calculates the crank angular acceleration from the crank angular velocity (operation S8). The engine torque estimation unit 40 calculates the product of a moment of inertia stored in the storage unit 50 and the crank angular acceleration calculated in the operation S8 to estimate engine torque (operation S9).

By interpolating the crank angular velocity in the tooth-missing region using two or more points corresponding to at least one of crank angular velocities before and after the tooth-missing region, the crank angular velocity is estimated with a high degree of accuracy. Therefore, engine torque which is obtained from the crank angular acceleration is estimated with a high degree of accuracy. By interpolating the crank angular velocity in the tooth-missing region using crank angular velocities at totaling three or more points before and after the tooth-missing region, the crank angular velocity is estimated with a higher degree of accuracy.

The crank angular velocity of the tooth-missing region may be interpolated from the crank angular velocities before and after the tooth-missing region, or the interpolation may not be limited to this. For example, there is a tendency that an error appears in the shape of protruding teeth around the tooth-missing region, for example, arising from a fabrication error of the crank rotor 60. In this case, since there is a tendency that an error appears in the crank angular velocities immediately before and after the tooth-missing region, the crank angular velocities immediately before and after the tooth-missing region may be interpolated additionally. From the crank angular velocities before and after the tooth-missing region, also the crank angular velocities immediately before and after the tooth-missing region may be interpolated in addition to the crank angular velocities in the tooth-missing region.

Figures 11A, 11B:
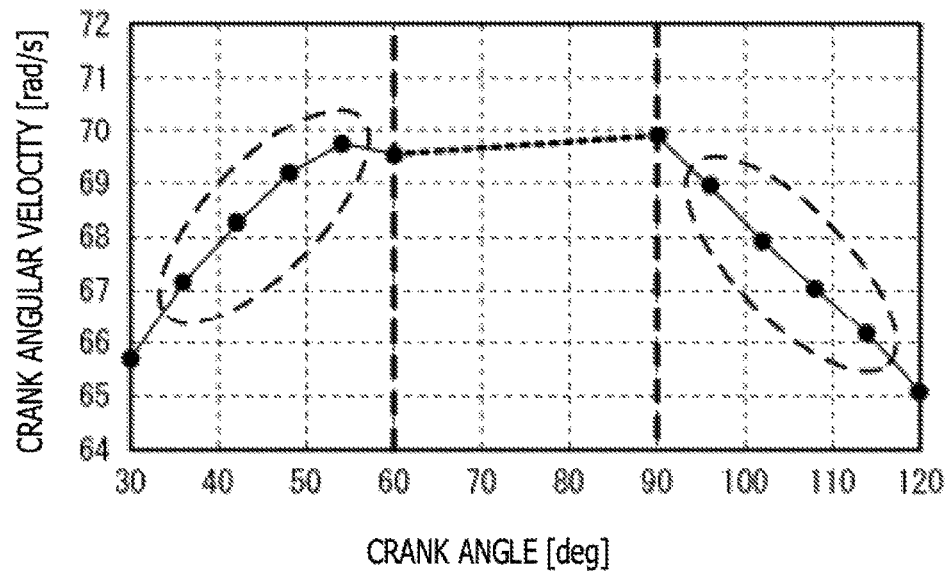
FIG. 11A illustrates another example of interpolation.
FIG. 11B illustrates another example of model parameters.

For example, the crank angular velocity estimation unit 30 interpolates the crank angular velocities immediately before and after the tooth-missing region in addition to the crank angular velocity in the tooth-missing region using two or more points corresponding to at least one of the crank angular velocities before and after the tooth-missing region. FIG. 11A illustrates another example of interpolation. FIG. 11B illustrates another example of model parameters. The crank angular velocity estimation unit 30 interpolates the crank angular velocity in the tooth-missing region, at 60 degrees before the tooth-missing region and at 90 degrees after the tooth-missing region by a mathematical model, for example, using four points (36, 42, 48 and 54 degrees) before the tooth-missing region and four points (96, 102, 108 and 114 degrees) after the tooth-missing region as depicted in FIG. 11A.

Each of the crank angular velocities at the six points (60, 66, 72, 78, 84 and 90 degrees) within a range from 60 degrees immediately before the tooth-missing region to 90 degrees immediately after the tooth-missing region is set as an objective variable. The model parameters may be obtained in advance. FIG. 11B illustrates model parameters for the objective variable. The model parameters of FIG. 11B are stored in the storage unit 50. The model parameters of FIG. 11B may be obtained for every engine speed.

Figure 12A:
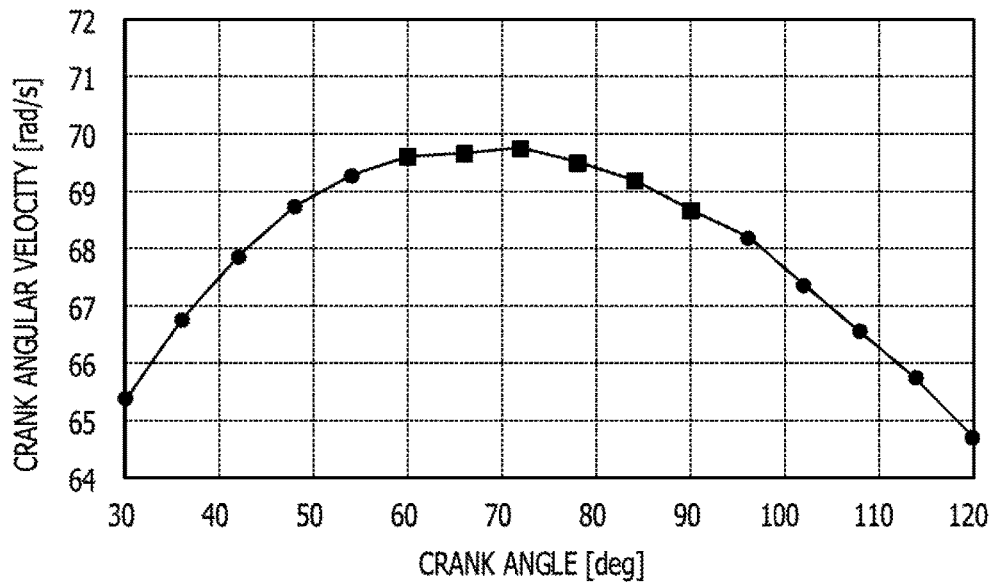
FIG. 12A illustrates another example of actual measurement values of a crank angular velocity within a zone that includes no missing tooth.

FIG. 12A illustrates another example of actual measurement values of the crank angular velocity within a zone that includes no missing tooth. Actual measurement values are indicated each by a round mark. As depicted in FIG. 12A, the actual measurement values of the crank angular velocity indicate a smooth curved line having less disorder. In FIG. 12A, estimation values of the crank angular velocity obtained using a multiple regression model are indicated additionally. Each estimation value is represented by a square mark. The six estimation values are estimated from a plurality of other actual measurement values. Since the difference is small between the actual measurement values and the estimation values, the crank angular velocity is estimated with a high degree of accuracy by using the multiple regression model.

Figure 12B:
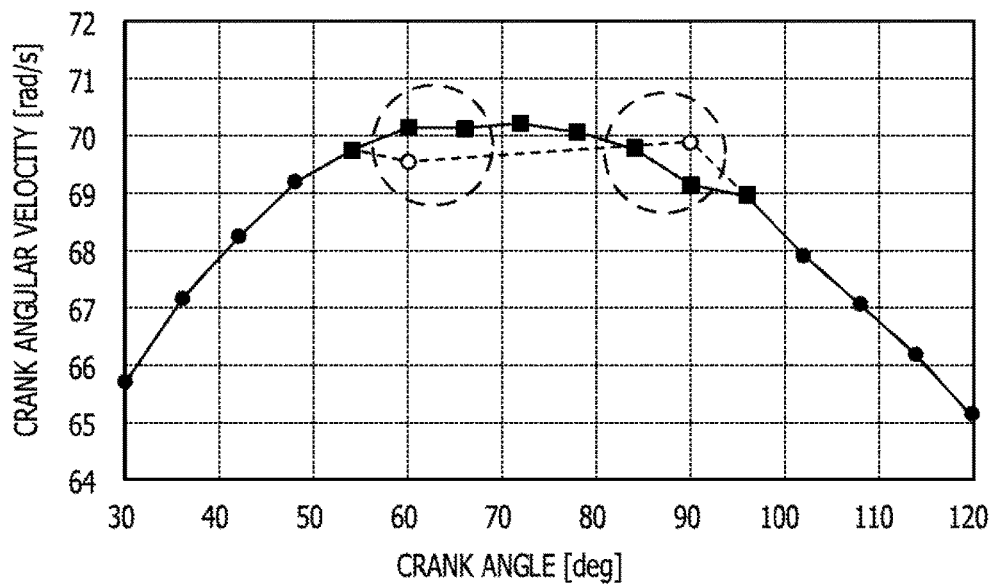
FIG. 12B illustrates another example of estimation values of a crank angular velocity calculated using a multiple regression model for a tooth-missing region.

FIG. 12B illustrates an example of the crank angular velocity estimated by interpolation. As depicted in FIG. 12B, by interpolating the crank angular velocity in the tooth-missing region and immediately after the tooth-missing region using the crank angular velocities before and after the tooth-missing region, estimation values proximate to the actual measurement values of the crank angular velocity are obtained as illustrated in FIG. 12A. For example, the crank angular velocity is calculated with a high degree of accuracy.

Figure 13A:
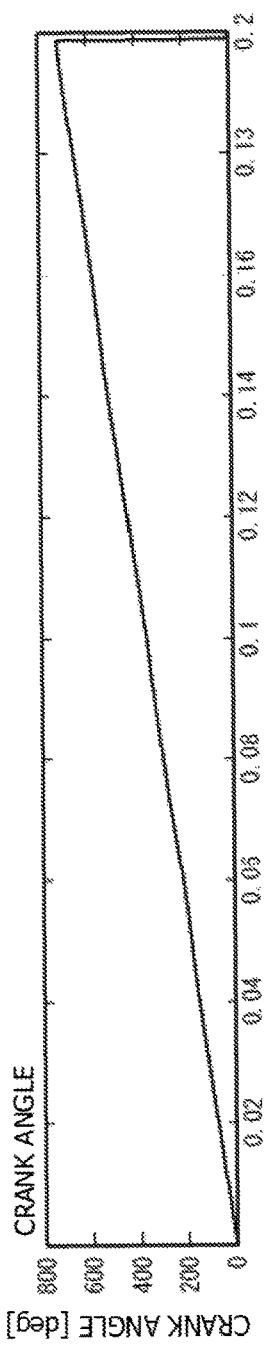
FIGS. 13A to 13C illustrate another example of estimation of toque.
Figure 13B:
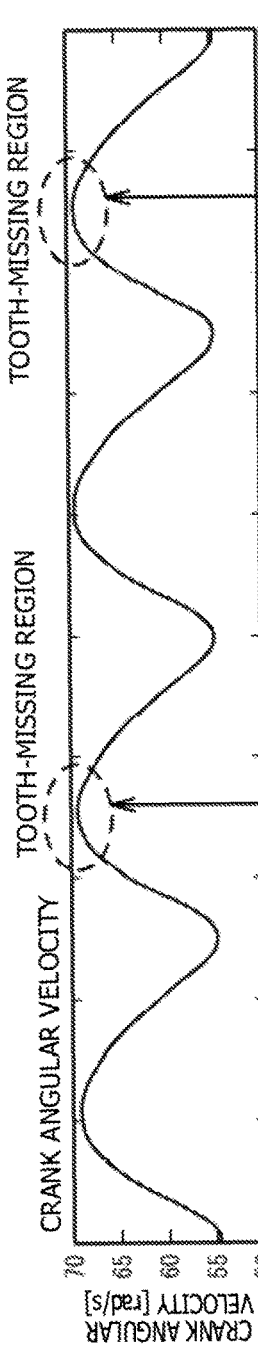
Figure 13C:
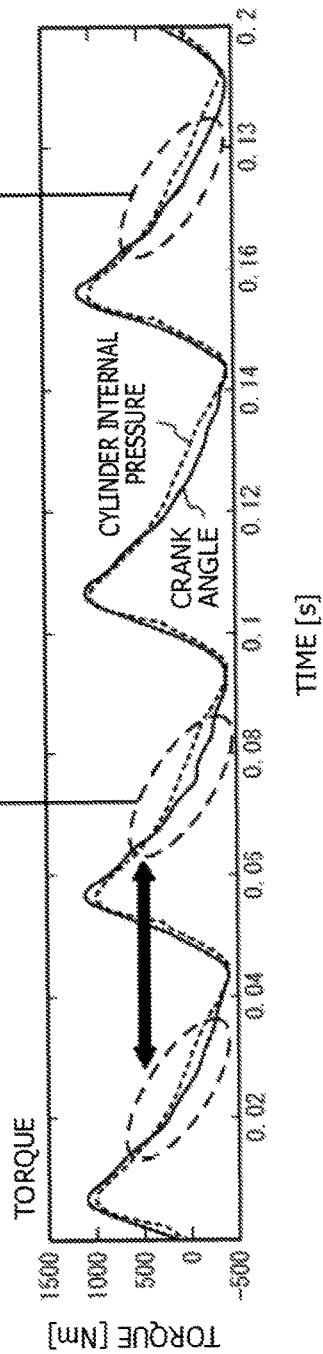

FIGS. 13A to 13C illustrate another example of estimation of torque. FIG. 13A illustrates a relationship between the elapsed time and the crank angle. FIG. 13B illustrates a relationship between the elapsed time and the crank angular velocity. FIG. 13C illustrates an example of torque estimated based on FIGS. 13A and 13B. The pitch of the crank rotor 60 is six degrees and the number of missing teeth is four. The tooth-missing region passes the crank angle sensor 10 in the proximity of 250 degrees and 610 degrees of the crank angle. The number of cylinders of the engine is four, and all cylinders combust once in two rotations (720 degrees) of the crankshaft.

A solid line curve in FIG. 13C indicates an example of the product of the crank angular velocity and the moment of inertia of the engine system. A broken line in FIG. 13C illustrates torque calculated from the cylinder volume and the variation of the cylinder internal pressure. As depicted in FIG. 13C, the difference between the solid line curve and the broken line curve is small. The waveform of the solid line curve has no disorder. For example, the torque estimation error is reduced.

By interpolating not only the crank angular velocity in the tooth-missing region but also the crank angular velocities immediately before and after the tooth-missing region using two or more points corresponding to at least one of the crank angular velocities before and after the tooth-missing region, such factors as the fabrication error of the crank rotor 60 are absorbed. Therefore, the crank angular velocity is estimated with a high degree of accuracy.

For example, the crank angular velocity estimation unit 30 functions as an example of an estimation unit that calculates a crank angular velocity at given time intervals and estimates a crank angular velocity corresponding to a tooth-missing region from crank angular velocities at two or more points corresponding to at least one of portions before and after the tooth-missing region. The engine torque estimation unit 40 functions as an example of a torque estimation unit that estimates torque of an internal combustion engine using the crank angular velocities estimated by the estimation unit.

Figure 14:
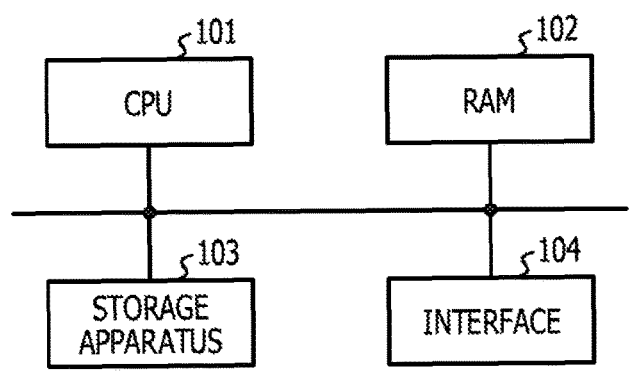
FIG. 14 depicts an example of a hardware configuration.

FIG. 14 depicts an example of a hardware configuration. The hardware configuration of the crank angle calculation unit 20, the crank angular velocity the estimation unit 30, the engine torque estimation unit 40 and the storage unit 50 is depicted in FIG. 14. As depicted in FIG. 14, the crank angle calculation unit 20, the crank angular velocity estimation unit 30, the engine torque estimation unit 40 and the storage unit 50 include a central processing unit (CPU) 101, a random access memory (RAM) 102, a storage apparatus 103, an interface 104 and so forth. The components mentioned are coupled with each other by a bus. The CPU 101 is a central arithmetic operation processing apparatus. The CPU 101 includes one or more cores. The RAM 102 may be a volatile memory that temporarily stores a program to be executed by the CPU 101, data to be processed by the CPU 101 and so forth. The storage apparatus 103 may be a nonvolatile storage device. As the storage apparatus 103, for example, a read only memory (ROM), a solid state drive (SSD) such as a flash memory, a hard disk to be driven by a hard disk drive and so forth may be used. An estimation program is stored in the storage apparatus 103. As the CPU 101 executes the estimation program, functions of the crank angle calculation unit 20, the crank angular velocity estimation unit 30, the engine torque estimation unit 40 and the storage unit 50 are executed. The crank angle calculation unit 20, the crank angular velocity estimation unit 30, the engine torque estimation unit 40 and the storage unit 50 may be hardware such as a microcomputer, a field programmable gate array (FPGA) or a programmable logic controller (PLC). The crank angle calculation unit 20, the crank angular velocity estimation unit 30, the engine torque estimation unit 40 and the storage unit 50 may each be a circuit for exclusive use.

Figure 15:
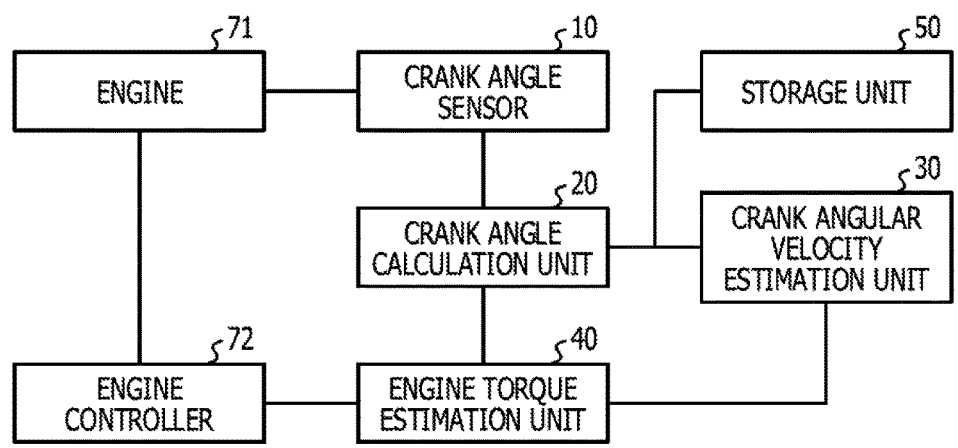
FIG. 15 depicts an example of an engine system to which an estimation apparatus is applied.

FIG. 15 depicts an example of an engine system to which the estimation apparatus is applied. The engine may be any internal combustion engine such as a gasoline engine or a diesel engine capable of being incorporated in a moving apparatus such as, for example, a passenger vehicle, a truck, a ship, an orbital vehicle, a motorcycle, an aircraft or a helicopter. The engine system includes an engine 71, a crank angle sensor 10, a crank angle calculation unit 20, a crank angular velocity estimation unit 30, an engine torque estimation unit 40, a storage unit 50 and an engine controller 72. The engine controller 72 performs a process for adjusting the fuel injection amount to an appropriate amount on the basis of a torque value obtained from the engine torque estimation unit 40 or the like.

Figure 16:
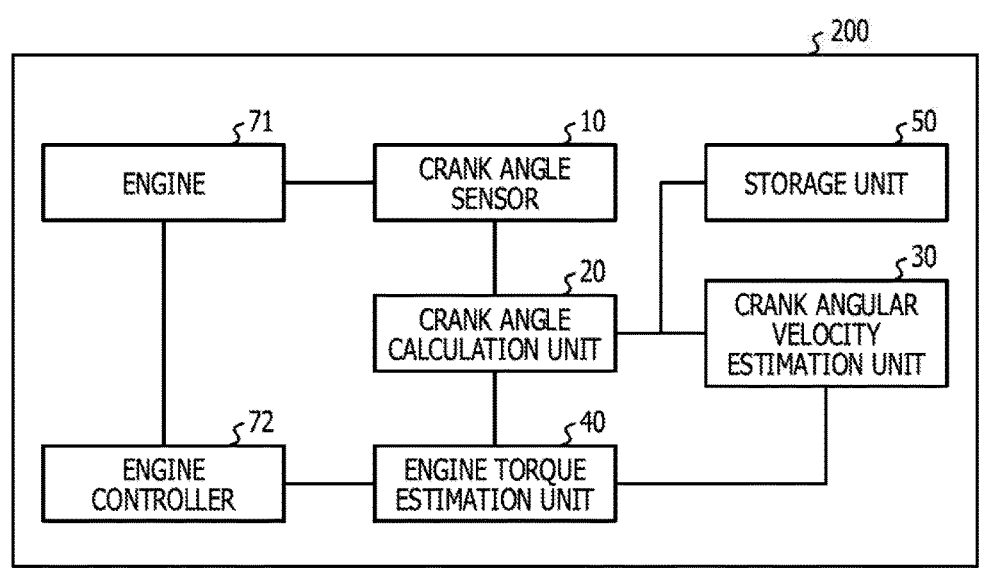
FIG. 16 depicts an example of a moving apparatus in which an engine system to which an estimation apparatus is applied is incorporated.

FIG. 16 depicts an example of the moving apparatus in which the engine system to which the estimation apparatus is applied is incorporated. As an example of a moving apparatus 200, a passenger vehicle, a truck, a ship, an orbital vehicle, a motorcycle, an aircraft, a helicopter and so forth in which an internal combustion engine such as a gasoline engine or a diesel engine is used may be listed.

Figure 17:
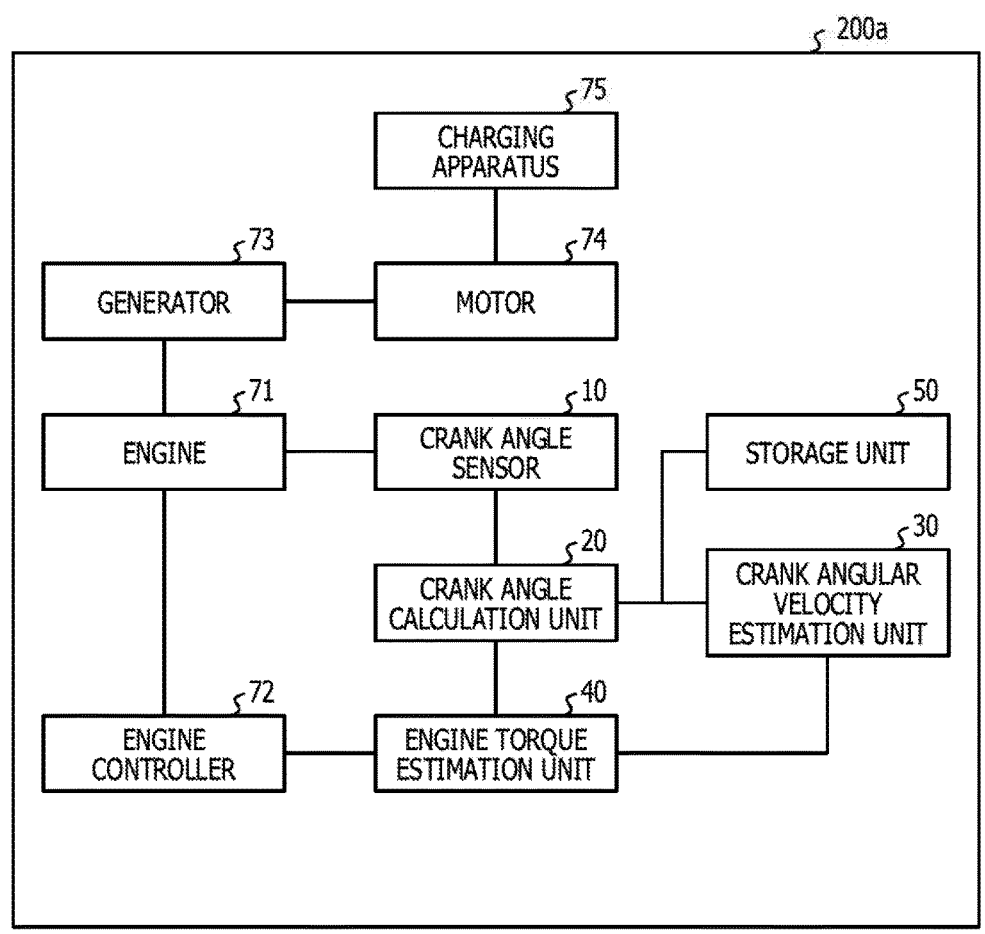
FIG. 17 depicts another example of a moving apparatus in which an engine system to which an estimation apparatus is applied is incorporated.

FIG. 17 depicts another example of the moving apparatus in which the engine system to which the estimation apparatus is applied is incorporated. FIG. 17 depicts a moving apparatus 200a that incorporates an engine system to which the estimation apparatus 100 is applied and converts kinetic energy by an engine 71 into electric power by a generator 73 such that the moving apparatus 200a is driven by a motor 74 by the electric power. The moving apparatus 200a may be moved by kinetic energy generated by the engine 71. The kinetic energy generated by the engine 71 may be converted into electric power by the generator 73 such that the moving apparatus 200a is moved by the motor 74. Electric power converted by the generator 73 may be accumulated into a charging apparatus 75 such that the motor 74 is operated by the accumulated electric power to move the moving apparatus 200a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An estimation apparatus, comprising:
a sensor, disposed in the proximity of a crank rotor, configured to output a signal in response to a positional variation of an outer periphery of the crank rotor, the crank rotor including a plurality of protruding teeth formed at given distances and a tooth-missing region on the outer periphery of the crank rotor and configured to rotate in an interlocking relationship with a crankshaft of an internal combustion engine; and
a processor configured to estimate a first crank angular velocity corresponding to the tooth-missing region from the signal output from the sensor, estimate a torque of the internal combustion engine based on the estimated first crank angular velocity, and control the internal combustion engine based on the estimated torque,
the processor is configured to select a plurality of first points which are selected from among a plurality of points on one side of the tooth-missing region on the crank rotor in which the tooth-missing region starts and are other than a first point immediately before the tooth-missing region on the one side and a plurality of second points which are selected from among a plurality of points on the other side of the tooth-missing region on the crank rotor in which the tooth-missing region ends and are other than a second point immediately after the tooth-missing region on the other side; calculate second crank angular velocities corresponding to the respective first points; calculate third crank angular velocities corresponding to the respective second points; and estimate the first crank angular velocity based on the second crank angular velocities and the third crank angular velocities.

2. The estimation apparatus according to claim 1, wherein the processor is configured to estimate the first crank angular velocity by interpolating a crank angular velocity in the tooth-missing region using a mathematical model.

3. The estimation apparatus according to claim 2, wherein the mathematical model is a multiple regression model.

4. The estimation apparatus according to claim 1, wherein, when the processor estimates the first crank angular velocity, the processor is configured to use a parameter in response to a speed of the internal combustion engine.

5. An estimation method, comprising:
outputting, by a sensor disposed in the proximity of a crank rotor, a signal in response to a positional variation of an outer periphery of the crank rotor, the crank rotor including a plurality of protruding teeth formed at given distances and a tooth-missing region on the outer periphery of the crank rotor and configured to rotate in an interlocking relationship with a crankshaft of an internal combustion engine;
selecting, by a computer, a plurality of first points, from among a plurality of points on one side of the tooth-missing region on the crank rotor in which the tooth-missing region starts, which are other than a first point immediately before the tooth-missing region on the one side and selecting a plurality of second points, from among a plurality of points on the other side of the tooth-missing region on the crank rotor in which the tooth-missing region ends, which are other than a second point immediately after the tooth-missing region on the other side;
calculating, by the computer, second crank angular velocities corresponding to the respective first points;
calculating, by the computer, third crank angular velocities corresponding to the respective second points;
estimating, by the computer, a first crank angular velocity corresponding to the tooth-missing region from the second crank angular velocities and the third crank angular velocities;
estimating, by the computer, a torque of the internal combustion engine based on the estimated first crank angular velocity; and
controlling the internal combustion engine based on the estimated torque.

6. The estimation method according to claim 5, further comprising:
estimating the first crank angular velocity by interpolating a crank angular velocity in the tooth-missing region using a mathematical model.

7. The estimation method according to claim 6, wherein the mathematical model is a multiple regression model.

8. The estimation method according to claim 5, wherein, when estimating the first crank angular velocity, a parameter is used in response to a speed of the internal combustion engine.

9. An engine system, comprising:
an internal combustion engine;
a sensor, disposed in the proximity of a crank rotor, configured to output a signal in response to a positional variation of an outer periphery of the crank rotor, the crank rotor including a plurality of protruding teeth formed at given distances and a tooth-missing region on an outer periphery and configured to rotate in an interlocking relationship with a crankshaft of the internal combustion engine;
a processor configured to estimate a first crank angular velocity corresponding to the tooth-missing region from the signal output from the sensor, estimate a torque of the internal combustion engine based on the estimated first crank angular velocity, and control the internal combustion engine based on the estimated torque; and
an engine controller configured to control the internal combustion engine based on the estimated torque,
the processor is configured to select selects a plurality of first points, from among a plurality of points on one side of the tooth-missing region on the crank rotor in which the tooth-missing region starts, which are other than a first point immediately before the tooth-missing region on the one side; select a plurality of second points, from among a plurality of points on the other side of the tooth-missing region on the crank rotor in which the tooth-missing region ends, which are other than a second point immediately after the tooth-missing region on the other side; calculate second crank angular velocities corresponding to the respective first points; calculate third crank angular velocities corresponding to the respective second points; and estimate the first crank angular velocity based on the second crank angular velocities and the third crank angular velocities.

10. The engine system according to claim 9, wherein the processor is configured to estimate the first crank angular velocity by interpolating a crank angular velocity in the tooth-missing region using a mathematical model.

11. The engine system according to claim 10, wherein the mathematical model is a multiple regression model.

12. The engine system according to claim 9, wherein, when the processor is configured to estimate the first crank angular velocity, the processor uses a parameter in response to a speed of the internal combustion engine.

* * * * *